Nov. 15, 1960 A. R. PUCCINELLI 2,960,056
ROADABLE BOATS
Filed Sept. 4, 1958 3 Sheets-Sheet 3
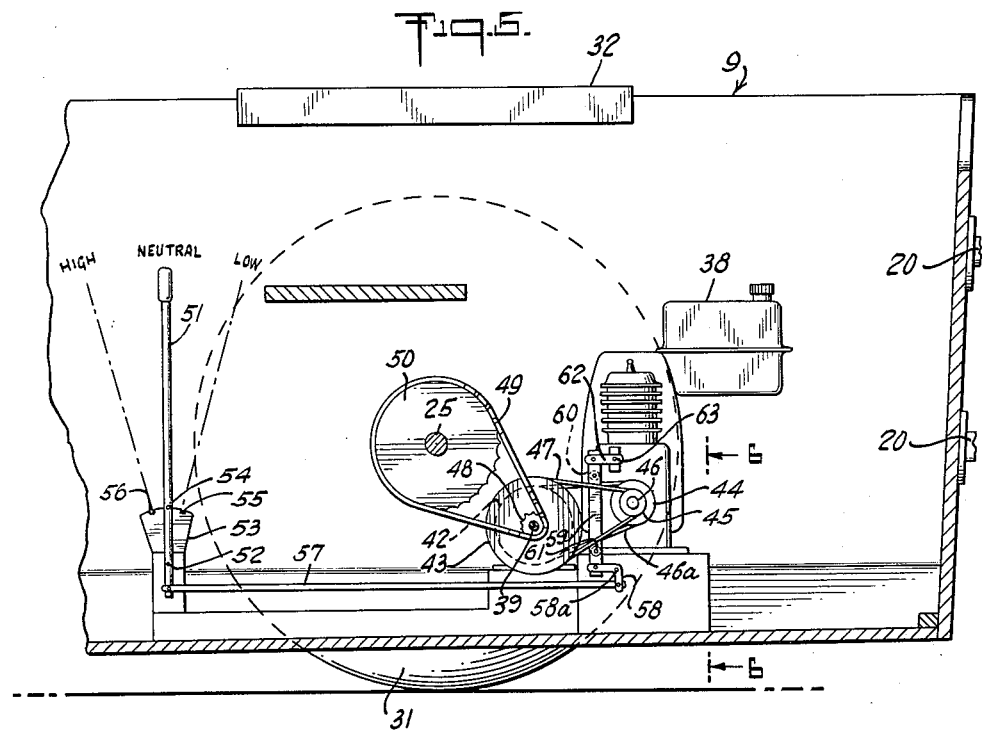
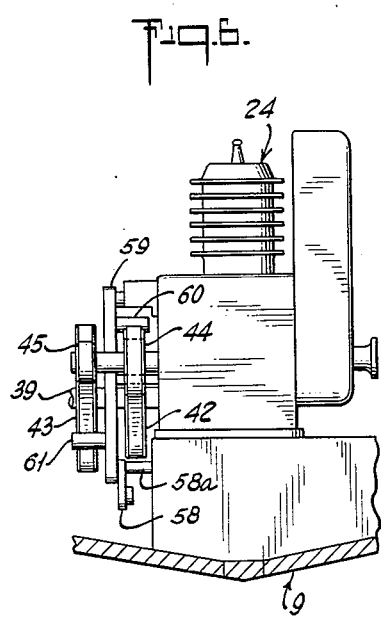
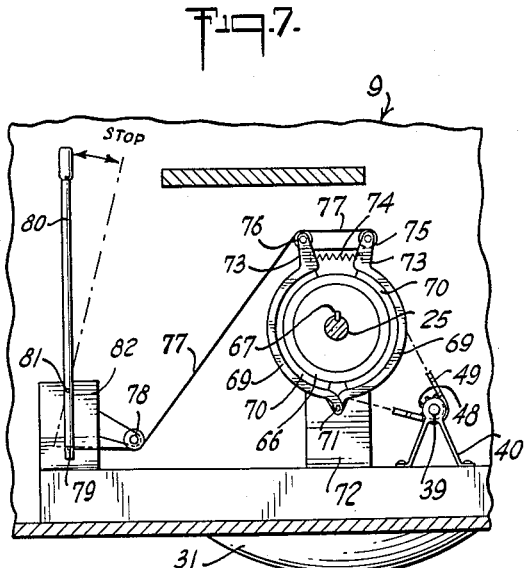
INVENTOR
ALFRED R. PUCCINELLI
BY Charles A. Morton
ATTORNEY United States Patent Office 2,960,056
Patented Nov. 15, 1960

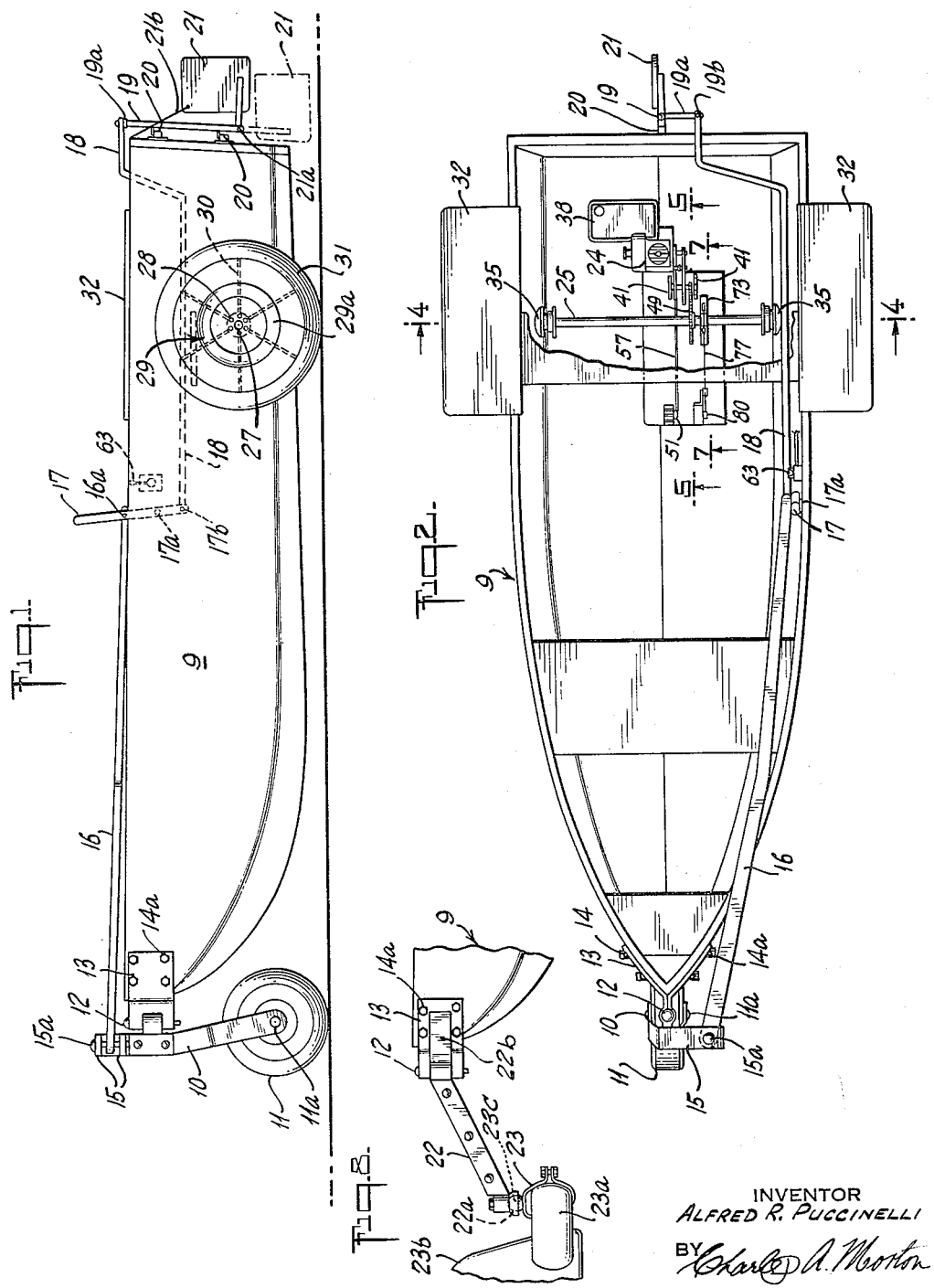
Nov. 15, 1960 — A. R. PUCCINELLI — 2,960,056
ROADABLE BOATS
Filed Sept. 4, 1958 — 3 Sheets-Sheet 1
INVENTOR
*ALFRED R. PUCCINELLI*
BY
ATTORNEY

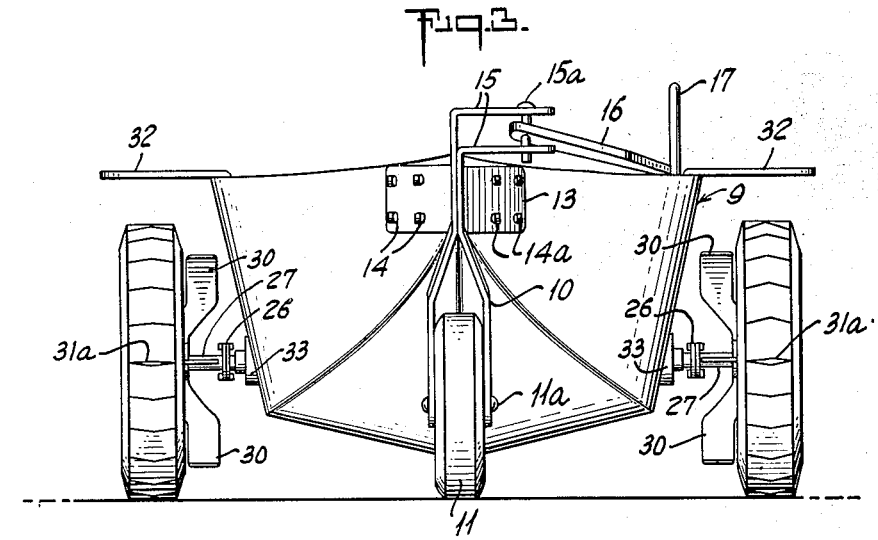
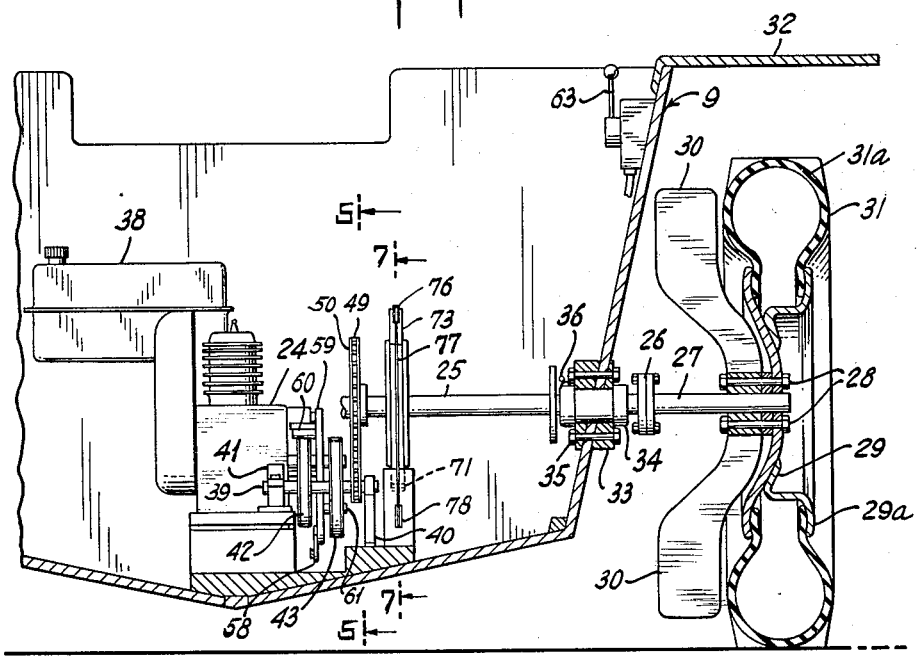

2,960,056
ROADABLE BOATS
Alfred R. Puccinelli, 36 Bay Drive E., Bay Hills, Huntington, N.Y.
Filed Sept. 4, 1958, Ser. No. 759,025
2 Claims. (Cl. 115—1)

This invention relates to a roadable boat that is a boat which can be operated on both land and water, from land to water, or from water to land, without any change either in the propelling or the operating technique.

One object of this invention is a self-propelled boat which can travel through the water or on land, snow, or ice.

Another object is a self-propelled roadable boat which can be operated on land as a motor vehicle, towed as a trailer, or driven into the water and operated as a motor boat.

Another object is a self-propelled triphibian capable of operating on land, water, snow, or ice.

Another object is a roadable boat which may be garaged and loaded at home as with passengers, sailing and fishing gear, and driven along the highway directly into the water, and back again, thus eliminating the need for launching, hauling, mooring, and docking facilities.

Another object is to facilitate the use of a power boat as a landing craft and as a motor vehicle.

Another object is a roadable boat which can be steered on land or on water by steering gear common to both steering means.

Another object is a roadable boat having a power transmission of simple design.

Another object is a roadable boat having a common propulsion system for moving the boat on land, ice, through snow, or in the water.

These and other objects will more fully appear from the detailed description.

In the drawing consisting of three sheets of eight figures, numbered Figs. 1 to 8, inclusive.

Fig. 1 is a side elevation of one embodiment of my roadable boat arranged for use either as an automobile, or as a boat.

Fig. 2 is a plan view of the same, with some of the parts partially broken away.

Fig. 3 is a front end view looking sternwards from in front of the bow.

Fig. 4 is a transverse cross sectional view, taken along the line 4—4 of Fig. 2, looking aft in the direction of the arrows, and partially broken away.

Fig. 5 is a longitudinal sectional view taken along the line 5—5 of Fig. 4, looking in the direction of the arrows, and partially broken away.

Fig. 6 is a vertical cross sectional view of a fragment, taken along the line 6—6 of Fig. 5, looking in the direction of the arrows.

Fig. 7 is a longitudinal sectional view of a fragment, taken along the line 7—7 of Fig. 2, looking in the direction of the arrows; and Fig. 8 is a side view of a tow bar coupled to haul the boat as a trailer behind a motor vehicle.

Like reference characters designate corresponding parts throughout the several figures of the drawing.

For steering the boat on land, the bow of the boat is provided with a forked bracket 10, wherein the front wheel 11 is free to rotate upon an axle or spindle 11a.

The bracket 10 is pivotally mounted by means of a pintle 12 between the spaced lugs of a forked plate 13 bolted to the bow of the boat by means of a series of bolts 14 and lock nuts 14a. The bracket 10 is provided with crank arms 15, 15 which are coupled by means of a headed pin 15a to a steering rod 16 which is linked at 16a to a steering lever 17. Steering lever 17 is pivotally mounted at 17a upon the frame of the boat, and the lower end of lever 17 is linked at 17b to a rudder steering rod 18. The rudder post 19 includes a crank arm 19a which is pivoted to the steering rod 18 at 19b. The rudder post 19 is rotatably supported in the gudgeons 20, 20 and the rudder 21 is hinged at 21a to the lower end of the rudder post 19 so that the rudder may be lowered from the inoperative position shown in the bold lines in Fig. 1, into its operative position shown in dot and dash lines in Fig. 1 by means of the rudder controlled cable 21b. It thus appears that the boat may be steered either on land or in the water from the same steering position by the movement of a common steering lever 17 which simultaneously controls the steering movement of both the front wheel 11 and of the rudder 21, over the tandem coupled steering rod 16 and rudder rod 18.

When the boat is ashore it may be towed by a motor vehicle. To do this, the pin 15a is withdrawn to disconnect the steering rod 16, and the pintle 12 is then withdrawn and the forked bracket 10 and the front wheel 11 may be detached as one unit from the forked plate 13 and replaced by a forked tow bar 22 which is mounted between the spaced lugs of the plate 13 and is secured between said lugs by the pintle 12. At its forward end the tow bar is provided with a socket 22a in which rests the knuckle 23c, said socket 22a and knuckle 23c in conjunction, forming a ball and socket connection. The knuckle 23c projects above the trailer hitch post 23 of which it forms a part, and the post 23 is suitably clamped to the rear bumper 23a of a motor vehicle 23b. At its opposite or rear end, the tow bar 22 is forked at 22b to fit over the diverging arms of the forked plate 13 (Fig. 8), thus locking the tow bar 22 upon the plate 13 so that it can not turn about the pintle 12. This arrangement prevents the boat 9 when under tow as a trailer from colliding with the motor vehicle 23b.

The engine 24 is the common source of motive power for the triphibian 9 whether propelled through water as a boat, or driven as a motor vehicle either upon ice, snow, or land. Through suitable belts, pulleys, chains, and sprockets, the engine 24 drives the main drive shaft 25 which is coupled by the flanged couplings 26, 26 to the shafts 27, 27 (Figs. 3 and 4), which in turn are suitably bolted at 28, 28 (Fig. 4) to the wheels 29, 29 and the paddles 30, 30, so that said wheels and paddles rotate together as one unit when the engine 24 is operating in gear.

Low pressure pneumatic tires 31, having heavy tractor type treads 31a, are mounted upon the rims 29a of the wheels 29. The tires 31, at low pressure, are of such displacement that they provide sufficient traction to drive the amphibian over mud or soft sand or ice, or over the highways. Splash guards 32 deflect spray, water, mud, or other substances or objects, away from the gunwale of the boat 9, thus protecting the occupants of the boat from discomfort and injury.

The stuffing box 33, stuffing box bearing 34, and the bolts 35, in conjunction, seal off the opening in the hull, and the opening which surrounds the main drive shaft 25, thus insuring water tight connections therebetween. The grease supply to the stuffing box 33, and to the box bearing 34, may be renewed whenever necessary, through the grease fitting 36 (Fig. 4).

The engine 24 (Fig. 6) is an internal combustion engine. It is provided with a gas tank 38 for storing the gasoline fuel. The engine may be either air, or water, cooled. The main drive shaft 25 may be driven at either high, or low, speed, by means of a system of grooved pulleys, pulley belts, and chain driven sprockets. An idler shaft 39 (Fig. 5), is journalled in bearings which are supported in the bearing brackets 40 and 41 (Fig. 4), and two idler pulleys 42 and 43 (Fig. 5), are keyed to idler shaft 39. High speed pulley 42 is smaller in diameter than low speed pulley 43. The pulleys 42 and 43 are belt driven from the pulleys 44 and 45, respectively, through the belts 46a and 47 (see Fig. 5). The pulleys 44 and 45 are keyed to the engine shaft 46 in known manner. The pulley ratios are such, that pulley 44 drives pulley 42 at high speed, and pulley 45 drives pulley 43 at low speed. A sprocket 48 is also keyed to idler shaft 39 (Fig. 5). Said sprocket 48 drives the chain 49 which in turn drives the large sprocket gear 50. The sprocket gear 50 is keyed to, and drives, the main drive shaft 25 (Figs. 4 and 5). Shaft 25 in turn drives the wheels 29 and paddles 30 (Fig. 4), under control of a clutch system.

The clutch system is best shown in Figs. 5 and 6. It may consist of a control lever 51 (Fig. 5), pivoted at 52 upon a bracket 53, so that the lever 51 is movable about the pivot 52 into any one of three control positions 54, 55 and 56, representing neutral, low speed, and high speed, respectively. Control lever 51 is coupled to one end of a push-pull rod 57, and the opposite end of said rod 57 is pivoted to one arm of a bell crank lever 58. Bell crank lever 58 is pivoted at 58a to the frame of the engine, and its opposite end is pivoted to an idler control rod 59. The rod 59 supports two freely rotatable spaced idler rollers 60 and 61. At its opposite end, the idler control rod 59 is pivotally connected to a rocker arm 62 whose opposite end is pivoted at 63 to the frame of the engine. Thus whenever the control lever 51 is rocked from its neutral position to position 55, or 56, or back again, the push-pull rod 57 slides to the left or to the right (Fig. 5), to rock the bell crank lever 58 about its pivot 58a, thus raising or lowering the idler control rod 59, to cause one or the other of the idler rollers 60 and 61 to engage with, or to be disengaged from, the high, or the low, speed belts 46a, or 47, to vary the speed of rotation of the idler shaft 39 and of the sprocket 48 keyed thereto and thus change the speed of rotation of the sprocket gear 50 and of the main drive shaft 25 which drives the wheels 29 and the paddles 30. For example, when control lever 51 is in neutral position, the idler control rod 59 is positioned as shown in Fig. 5, thus holding both of the idler rollers 60 and 61 out of engagement with their respective belts 46a and 47 (Fig. 5), hence the idler pulleys 42 and 43 and the idler shaft 39 are all stationary.

When the control lever 51 is rocked on its pivot 52 to position 55 (Fig. 5), push-pull rod 57 operates bell crank 58 to raise idler control rod 59 and thus bring idler roller 61 into engagement with low speed belt 47 and thus apply sufficient tension thereto to drive (low speed) idler pulley 43, sprocket 48, chain drive 49, and sprocket gear 50, and drive main drive shaft 25, wheels 29, and paddles 30, at low speed.

Similarly when control lever 51 is rocked on its pivot 52 to position 56 (Fig. 5), push-pull rod 57 slides to the left and rocks bell crank lever 58 counter-clockwise to draw idler control rod 59 downwards and cause idler roller 60 to apply sufficient tension to high speed belt 46a to drive idler pulley 42 and sprocket 48 at high speed, thus increasing the speed of drive chain 49, sprocket gear 50, main drive shaft 25, and wheels 29 and paddles 30.

The throttle 63 (Fig. 4) which controls the supply of fuel to the engine 24, in known manner, is positioned at the driver's seat (see Fig. 2).

The boat, or triphibian 9, is provided with a suitable braking system. It may consist (Fig. 7) of a flanged drum 66, keyed at 67 upon the main drive shaft 25. Between the flanges (not shown) of the drum 66 are the brake shoes 69, which are lined with a conventional brake lining material 70. The brake shoes 69, 69 are pivotally supported at 71 upon a base 72. The brake shoes terminate in the ears 73, 73 which are spaced apart to receive the expansion spring 74, and to support the cable guide pulleys 75 and 76. The brake control cable 77 which is anchored to the ear 73 which supports the guide pulley 76. The cable 77 then passes around the guide pulleys 75, 76 and 78, and is attached at 79 to the lower arm of the brake lever 80. The lever 80 is pivoted at 81 to the frame of the boat 9. When the brake lever 80 is in an upright position as indicated in bold lines in Fig. 7, the control cable 77 is not under braking tension, and the spring 74 expands to maintain the brake shoes 69, 69 open, so that their brake linings 70, 70 are out of engagement with the flared walls of the channel formed by the outwardly diverging spaced flanges of brake drum 66, thus allowing the main drive shaft 25 to turn freely whenever the clutch 51 is in gear. When the brake lever 80 is moved into the dotted line position shown in Fig. 7, the control cable 77 is placed under tension and draws the ears 73, 73 towards each other against the increased tension of the expansion spring 74 to bring the linings 70, 70 of the brake shoes 69, 69 into frictional engagement with the walls of the brake drum channel, thus effecting a braking action upon the main drive shaft 25, and upon the wheels 29 and the paddles 30.

The machine may be said to be triphibious, because when assembled as shown in Figs. 1 and 2, it may be operated on land (including mud, soft sand, and snow), on water, or on ice. It may be driven from land into water, and when the body is afloat, the rudder 21 is lowered and used to steer the boat. Similarly when afloat, the boat may be steered into shallow water until the wheels are aground, whereupon the rudder may be raised and the machine driven ashore as a motor vehicle. By replacing the front wheel assembly with the tow bar 22, the machine can be hauled as a trailer (Fig. 8).

The drive shaft 25 is so positioned, that under normal load conditions of the boat 9, only the lower half of the paddle wheels 30, 30 are under water.

The speed changing mechanism, or transmission (Figs. 4 and 5), may also include a reversing mechanism (not shown), to effect rearward movement of the amphibious boat 9.

What is claimed is:

1. In a triphibian and in combination a boat hull having side walls converging to form the bow of the boat and a hull bottom, a drive shaft journalled in said side walls with a watertight fit and projecting beyond said side walls, paddle wheels secured adjacent the opposite ends of said drive shaft for propelling said triphibian as a boat, a rudder pivotally supported at the stern of said boat for steering said triphibian through water, means for lifting said rudder out of steering position, wheels secured to the opposite ends of said drive shaft, a third wheel pivotally supported in the bow of said boat, said wheels in conjunction being operable to drive and to steer said triphibian as a land vehicle, pneumatic tires mounted upon the rims of said wheels, said tires having tractor treads and being of sufficient displacement when inflated at a relatively low pressure to provide sufficient traction to drive and to steer said triphibian over mud, soft sand, snow, and ice, steering mechanism common to and for operating said rudder and said steering wheel simultaneously, said steering mechanism including a common steering lever, said lever being pivotally mounted between its opposite ends to subdivide said lever into two lever arms, a steering rod interconnecting said rudder and one arm of said lever, and a second steering rod interconnecting said third wheel and the other arm of said lever.

2. A self-propelled triphibian convertible into a trailer and back again comprising a boat hull having a bow, a stern, side walls converging at an angle at the bow and diverging towards the stern, bottom walls merging with said side walls and with each other to form the hull bottom, an angle bracket having a hub, forked arms diverging rearwardly from said hub at an angle which enables the converging side walls of said bow to nest between said forked arms, means for securing said diverging forked arms to said converging side walls to anchor said angle bracket to said bow, said angle bracket having vertically spaced lugs formed on its said hub projecting forwardly from said bow, vertically aligned holes formed in said spaced lugs, a steering wheel fixture, a steering wheel mounted to rotate in said fixture, said fixture having a holed lug formed thereon sized to register between the spaced lugs of said hub to bring said hole in said fixture lug into alignment with the vertically aligned holes of the spaced lugs of said hub, a pin sized to register in the holes in said lugs when so aligned and thus pivotally secure said steering wheel fixture to said bow via said angle bracket, said steering wheel rotating in said fixture and pivoting with said fixture to effect the steering of said triphibian when self-propelled as a land vehicle, a rudder pivotally supported upon the stern of the hull for steering said triphibian when propelled through water, means for lifting said rudder out of steering position when said triphibian approaches land, steering mechanism common to said steering wheel and to said rudder for operating said steering wheel and said rudder simultaneously, said steering mechanism including a lever arm pivotally mounted between its opposite ends to subdivide said lever arm into two branches, a steering rod interconnecting said steering wheel fixture and one branch of said lever arm, a second steering rod interconnecting said rudder and the other branch of said lever arm, a drive shaft journalled in the side walls of said boat hull, paddle wheels and drive wheels mounted in tandem upon said shaft, pneumatic tires mounted upon the rims of said drive wheels and of said steering wheel, said tires having tractor-like treads and being of sufficient displacement when inflated at a relatively low pressure to provide sufficient traction to drive and steer said triphibian over mud, soft sand, snow, and ice, said drive wheels being free to revolve when said triphibian is converted into a trailer, an internal combustion engine, and transmission mechanism for coupling said engine to said drive shaft at will to drive said shaft, said paddle wheels and said drive wheels in unison to propel said triphibian as a boat when afloat and as a motor vehicle when aground.

References Cited in the file of this patent

UNITED STATES PATENTS

| | | |
|---|---|---|
| 780,835 | Such | Jan. 24, 1905 |
| 2,238,844 | Arbeitlang | Apr. 15, 1941 |
| 2,268,181 | Bolton | Dec. 30, 1941 |
| 2,278,255 | Grabbe | Mar. 31, 1942 |
| 2,399,141 | Quinn | Apr. 23, 1946 |
| 2,449,320 | Raimondi | Sept. 14, 1948 |
| 2,455,048 | Du Brie | Nov. 30, 1948 |
| 2,631,559 | Jones | Mar. 17, 1953 |
| 2,840,392 | Miles et al. | June 24, 1958 |